US010158996B2

(12) United States Patent
Van Phan et al.

(10) Patent No.: US 10,158,996 B2
(45) Date of Patent: Dec. 18, 2018

(54) ENABLING CELLULAR ACCESS (71) Applicant: Nokia Solutions and Networks Oy, Espoo (FI)

(72) Inventors: Vinh Van Phan, Oulu (FI); Ling Yu, Kauniainen (FI); Kari Veikko Horneman, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 89 days.

(21) Appl. No.: 15/027,781

(22) PCT Filed: Oct. 10, 2013

(86) PCT No.: PCT/EP2013/071134
§ 371 (c)(1),
(2) Date: Apr. 7, 2016

(87) PCT Pub. No.: WO2015/051844
PCT Pub. Date: Apr. 16, 2015

(65) Prior Publication Data
US 2016/0242036 A1    Aug. 18, 2016

(51) Int. Cl.
*H04W 12/08* (2009.01)
*H04W 12/04* (2009.01)
*H04W 12/06* (2009.01)
*H04W 76/14* (2018.01)
*H04W 8/20* (2009.01)

(52) U.S. Cl.
CPC .......... *H04W 12/08* (2013.01); *H04W 12/04* (2013.01); *H04W 12/06* (2013.01); *H04W 76/14* (2018.02); *H04W 8/205* (2013.01)

(58) Field of Classification Search
CPC ... H04W 76/023; H04W 8/005; H04W 92/18; H04W 72/02; H04W 24/10; H04W 72/1215; H04W 4/005
USPC .............................................. 455/426.1, 411
See application file for complete search history.

(56) References Cited

U.S. PATENT DOCUMENTS

| 8,627,438 | B1* | 1/2014 | Bhimanaik | H04L 63/10 |
| | | | | 726/9 |
| 2008/0270619 | A1* | 10/2008 | Davies | H04L 63/08 |
| | | | | 709/229 |
| 2011/0028126 | A1* | 2/2011 | Lim | H04L 63/0853 |
| | | | | 455/411 |
| 2012/0030075 | A1* | 2/2012 | Ahmed | G06Q 30/04 |
| | | | | 705/30 |
| 2013/0160101 | A1* | 6/2013 | Hakola | H04W 76/023 |
| | | | | 726/7 |
| 2013/0247161 | A1 | 9/2013 | Bajko | 726/7 |

(Continued)

OTHER PUBLICATIONS

SA WG2 Meeting #96, San Diego, USA, Apr. 8-12, 2013, S2-130979, "Solution for ProSe discovery and communication", ZTE, 9 pgs.

(Continued)

*Primary Examiner* — Fred Casca
(74) *Attorney, Agent, or Firm* — Harrington & Smith (57) ABSTRACT Apparatuses and methods in a communication system are provided. The solution includes communicating with a communication system as authentic and authorized user equipment; storing information on another user equipment and communicating with the communication system to authorize the access of another user equipment to the communication system.

22 Claims, 5 Drawing Sheets (56) References Cited

U.S. PATENT DOCUMENTS

| | | | | |
|---|---|---|---|---|
| 2014/0204771 A1* | 7/2014 | Gao | ............... | H04W 36/28 |
| | | | | 370/252 |
| 2014/0241264 A1* | 8/2014 | Liu | ............... | H04W 76/32 |
| | | | | 370/329 |
| 2015/0052580 A1* | 2/2015 | Delsol | ............. | H04L 63/20 |
| | | | | 726/3 |

OTHER PUBLICATIONS

3GPP Draft, S3-130882, 3GPP TR 33.cde V0.2.0 (Jul. 2013), "$3^{rd}$ Generation Partnership Project; Technical Specification Group Services and System Aspects Study on security issues to support Proximity Services (Release 12)", marked and clean versions, 43 pgs.

* cited by examiner

ENABLING CELLULAR ACCESS

FIELD

The exemplary and non-limiting embodiments of the invention relate generally to wireless communication systems. Embodiments of the invention relate especially to apparatuses, methods, and computer program products in communication networks.

BACKGROUND

The following description of background art may include insights, discoveries, understandings or disclosures, or associations together with disclosures not known to the relevant art prior to the present invention but provided by the invention. Some of such contributions of the invention may be specifically pointed out below, whereas other such contributions of the invention will be apparent from their context.

In cellular radio communication networks, such as the Long Term Evolution (LTE) or the LTE-Advanced (LTE-A) of the 3rd Generation Partnership Project (3GPP), network planning comprises the use of common base stations (Node B, NB). User equipment (UE) may communicate with another UE via the base station(s), for example. Alternatively, it is proposed that the UEs may communicate directly with each other by applying resources dedicated by the network for a device-to-device (D2D) direct communication. The D2D communication has proven to be network efficient by offloading the traffic processed in the base station(s), for example.

New kind of devices and services are being constantly developed. For example, user equipment capable of communication with cellular communication networks such as LTE may be other than traditional mobile phones. Laptops and cameras may be equipped with capability to communicate directly with cellular communication networks such as LTE. However, in practice these devices comprise user equipment with different user interface.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to a more detailed description that is presented later.

According to an aspect of the present invention, there is provided an apparatus, comprising: at least one processor; and at least one memory including computer program code, the at least one memory and the computer program code configured to, with the at least one processor, cause the apparatus at least to: be capable of communicating with a communication system as authentic and authorized user equipment; be configured to store information on another user equipment; communicate with the communication system to authorize the access of another user equipment to the communication system.

According to an aspect of the present invention, there is provided an apparatus, comprising: at least one processor; and at least one memory including computer program code, the at least one memory and the computer program code configured to, with the at least one processor, cause the apparatus at least to: be configured to store information on user equipment authentic and authorized with a communication system; communicate with the communication system, wherein the communication is authorized by the authentic and authorized user equipment.

According to an aspect of the present invention, there is provided an apparatus of a communication system, comprising: at least one processor; and at least one memory including computer program code, the at least one memory and the computer program code configured to, with the at least one processor, cause the apparatus at least to: be capable of communicating with user equipment of the communication system; allow the access of first user equipment to the communication system, the access being authorized by second user equipment.

According to an aspect of the present invention, there is provided a method, comprising: communicating with a communication system as authentic and authorized user equipment; storing information on another user equipment; communicating with the communication system to authorize the access of another user equipment to the communication system.

According to an aspect of the present invention, there is provided a method, comprising: storing information on user equipment authentic and authorized with a communication system; communicating with the communication system, wherein the communication is authorized by the authentic and authorized user equipment.

According to an aspect of the present invention, there is provided a method, in a communication system, comprising: communicating with user equipment of the communication system; allowing the access of first user equipment to the communication system, the access being authorized by second user equipment.

LIST OF DRAWINGS

Embodiments of the present invention are described below, by way of example only, with reference to the accompanying drawings, in which.

DESCRIPTION OF SOME EMBODIMENTS

The following embodiments are only examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may also contain also features, structures, units, modules etc. that have not been specifically mentioned.

Some embodiments of the present invention are applicable to user equipment (UE), a base station, eNodeB, a network element of a communication system, a corresponding component, and/or to any communication system or any combination of different communication systems that support required functionality.

The protocols used, the specifications of communication systems, servers and user equipment, especially in wireless communication, develop rapidly. Such development may require extra changes to an embodiment. Therefore, all words and expressions should be interpreted broadly and they are intended to illustrate, not to restrict, embodiments.

Many different radio protocols to be used in communications systems exist. Some examples of different communication systems are the universal mobile telecommunications system (UMTS) radio access network (UTRAN), HSPA (High Speed Packet Access), long term evolution (LTE®, known also as evolved UMTS Terrestrial Radio Access Network E-UTRAN), long term evolution advanced (LTE-A), Wireless Local Area Network (WLAN) based on IEEE 802.11stardard, worldwide interoperability for microwave access (WiMAX®), Bluetooth®, personal communications services (PCS) and systems using ultra-wideband (UWB) technology. IEEE refers to the Institute of Electrical and Electronics Engineers. For example, LTE® and LTE-A are developed by the Third Generation Partnership Project 3GPP.

Figure 1:
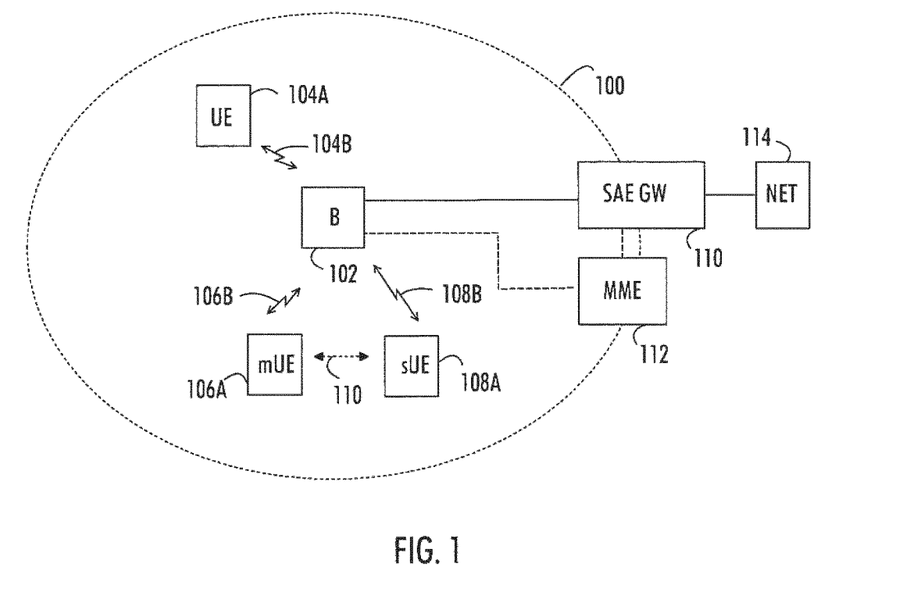
FIG. 1 illustrates an example of a communication environment.

FIG. 1 illustrates a simplified view of a communication environment only showing some elements and functional entities, all being logical units whose implementation may differ from what is shown. The connections shown in FIG. 1 are logical connections; the actual physical connections may be different. It is apparent to a person skilled in the art that the systems also comprise other functions and structures. It should be appreciated that the functions, structures, elements and the protocols used in or for communication are irrelevant to the actual invention. Therefore, they need not to be discussed in more detail here.

In the example of FIG. 1, a radio system based on LTE/SAE (Long Term Evolution/System Architecture Evolution) network elements is shown. However, the embodiments described in these examples are not limited to the LTE/SAE radio systems but can also be implemented in other radio systems.

The simplified example of a network of FIG. 1 comprises a SAE Gateway 110 and an MME 112. The SAE Gateway 110 provides a connection to Internet 114. FIG. 1 shows a base station or an eNodeB 102 serving a cell 100. In this example, the eNodeB 102 is connected to the SAE Gateway 110 and the MME 112.

The eNodeBs (Enhanced node Bs) of a communication system may host the functions for Radio Resource Management: Radio Bearer Control, Radio Admission Control, Connection Mobility Control, Dynamic Resource Allocation (scheduling). The MME 112 (Mobility Management Entity) is responsible for the overall UE control in mobility, session/call and state management with assistance of the eNodeBs through which the UEs connect to the network. The SAE GW 110 is an entity configured to act as a gateway between the network and other parts of communication network such as the Internet for example. The SAE GW may be a combination of two gateways, a serving gateway (S-GW) and a packet data network gateway (P-GW).

The eNodeB 102 may provide radio coverage to a cell 100. The cell 100 may be a macrocell, a microcell, or any other type of cell where radio coverage is present. Further, the cell 100 may be of any size or form, depending on the antenna system utilized. The eNodeB 102 may be used in order to provide radio coverage to the cell 100. The eNodeB 102 may control cellular radio communication links 104B, 106B established between the eNodeB 102 and terminal devices or user equipment 104A, 106A located within the cell 100. The communication links marked with solid arrows may be referred as conventional communication links 104B, 106B for end-to-end communication, where the source device transmits data to the destination device via the base station 100. Therefore, the user equipment 104 and 106 may communicate with each other via the base station 102. The user equipment may be a user equipment of a cellular communication system, e.g. a computer (PC), a laptop, a handheld computer, a mobile phone, or any other user terminal or user equipment capable of communicating with the cellular communication network.

The terminal devices or user equipment 104A, 106A may be denoted as authentic and authorized user equipment because they may independently communicate with the communication system. The communication is based on the Authentication, Authorization and Accounting (AAA) of the communicating user equipment itself. In LTE based communication systems the authentic and authorized user equipment comprise Universal Subscriber Identity Module (USIM) or Subscriber Identity Module (SIM). USIM/SIM is an application which may be stored on a card inserted to the UE and which comprises information on subscriber identity, authentication, accounting and security. USIM/SIM data is used for accessing services provided by communication systems.

In addition to or instead of the conventional communication links, direct device-to-device (D2D) connections may be established among terminal devices. Direct communication link between two devices may be established, e.g., between devices 106A and 108A in FIG. 1. A direct communication link 110 marked with a dashed arrow may be based on any radio technology such that the terminal devices or user equipment 106A and 108A involved in the direct communication may apply communication according to any of a plurality of radio access technologies. The eNodeB 102 may be responsible for controlling the direct communication link 110.

D2D communication links may be realized between authentic and authorized user equipment but also between different kinds of devices. In the example of FIG. 1, UE 106A is authentic and authorized user equipment but user equipment 108A may not be such. The UE 108A may be a device capable of D2D communication but it has no SIM/USIM and thus direct authentic and authorized communication with the communication system is not possible. On the other hand, the UE 108A may be authentic and authorized user equipment equipped with SIM/USIM but it may have restricted access to the communication system. For example, D2D communication, phone calls and text messaging may be allowed but data traffic may be prohibited.

In following, the authentic and authorized UE 106A is denoted as a master UE (mUE) and UE 108A which has restricted or no access to the communication system as a sub-UE (sUE).

In an embodiment, the mUE 106A may be configured to authenticate the access of the sUE 108A to the communication system. The mUE and sUE may communicate using D2D communication and form a device pair where the sUE is associated with the mUE. Thus, a method for facilitating cellular access for a restricted sUE with or without USIM/SIM is proposed, where an authentic and authorized mUE associated with the sUE provides on-the-fly assistance and authorization of the access.

For example, the sUE may be a personal machine without SIM such as a camera or a laptop. The sUE may upload or download on-line videos on the road directly using LTE cellular access which is set up with help of an authentic and authorized UE which is communicating with the machine via semi-autonomous D2D based on trusted relationship (e.g., both the machine and the UE belong to the same owner who wants to upload or download videos using the cellular access directly from the machine).

In another example, an active user may want to upload, download, watching, remote monitoring, talking and social networking in parallel using a number of separate devices and cellular access connections simultaneously. This may be seen as a new distributed UE capability (collective capability across multiple associated devices) for personal area networking which may be provided with multiple cellular access connections whether in tight coordination or not. In case those devices are forming a tight cooperative D2D cluster under control of the serving communication system, virtually single cellular access connection may be sufficient.

In another example, a 10 year old child may be allowed to use his/her UE for playing games on-line, surfing net or social networking only when there is an on-the-fly request or agreement from authentic and authorized UE of his/her guardian; otherwise the child can only make voice call and send messages with his/her device. That is, cellular access restrictions of a SIM device may be provided and controlled in a dynamic fashion in which some restrictions may be lifted on-the-fly with help from an authentic and authorized UE. This can be considered as a more flexible and dynamic step of the current pre-configured semi-static subscription profiles or parental guides in authorized multimedia devices.

Figure 2A:
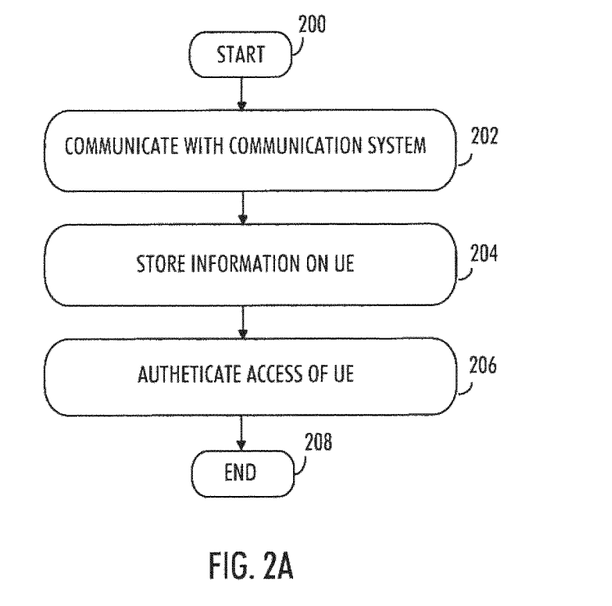
FIGS. 2A and 2B are flowcharts illustrating embodiments of the invention.

FIG. 2A is a flowchart illustrating an embodiment. The apparatus employing the embodiment may be authentic and authorized user equipment mUE of a communication system or network, for example. The process starts at step 200.

In step 202, the apparatus is configured to communicate or be capable of communicating with a communication system as authentic and authorized user equipment.

In step 204, the apparatus is configured to store information on another user equipment. The other user equipment may be a device capable of D2D communication but it has no SIM/USIM and thus direct authentic and authorized communication with the communication system is not possible. On the other hand, the user equipment may be authentic and authorized user equipment equipped with SIM/USIM but it may have restricted access to the communication system. The apparatus and the other user equipment form a device pair, where the apparatus is a master UE and the other UE is a sub-user device. The device pair may have been created beforehand or it may be created on the fly using D2D communication, for example.

In step 206, the apparatus is configured to communicate with the communication system to authorize the access of user equipment to the communication system.

The process ends in step 208.

Figure 2B:
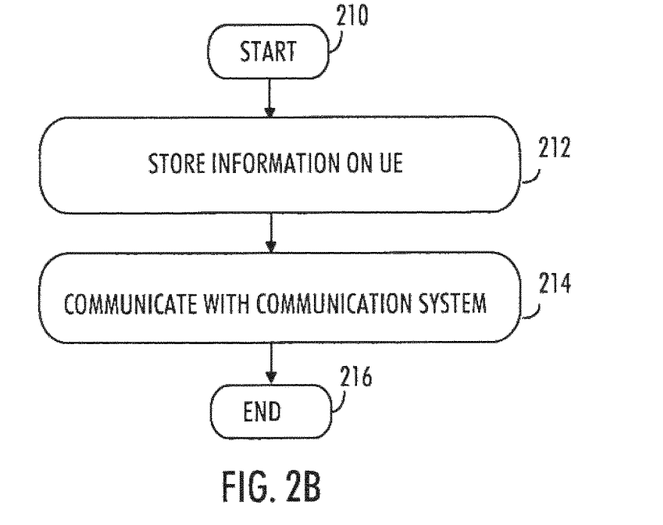

FIG. 2B is a flowchart illustrating an embodiment. The apparatus employing the embodiment may be sub-user apparatus sUE, for example. The process starts at step 210.

In step 212, the apparatus is configured to store information on user equipment authentic and authorized with a communication system. The apparatus and the other user equipment form a device pair, where the apparatus is a sub-user device and the other UE is a master UE. The device pair may have been created beforehand or it may be created on the fly using D2D communication, for example.

In step 214, the apparatus is configured to communicate with the communication system, wherein the communication is authorized by the authentic and authorized user equipment.

The process ends in step 216.

Figure 3A:
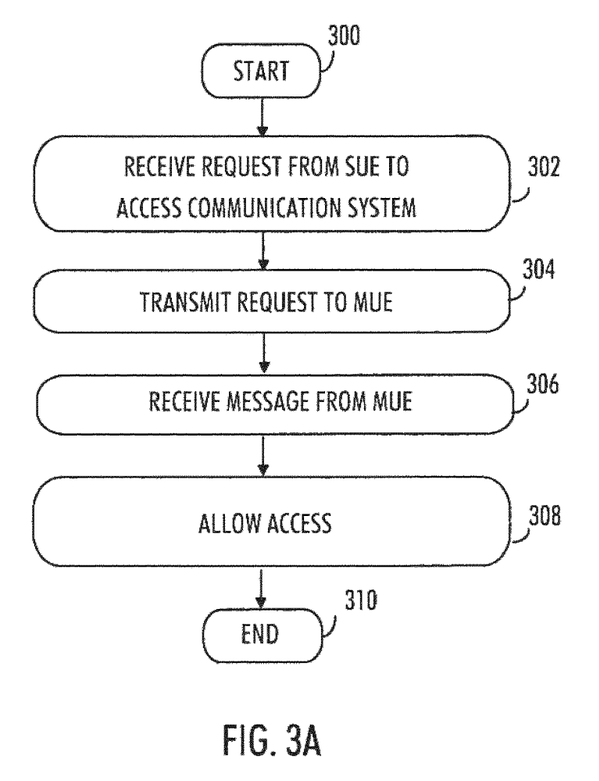
FIGS. 3A and 3B are flowcharts illustrating embodiments of the invention.

FIG. 3A is a flowchart illustrating an embodiment. The apparatus employing the embodiment may be a network element of a communication system. In this example, sUE is denoted as first user equipment and mUE as second user equipment. The process starts at step 300.

In step 302, the apparatus is configured to receive from the first user equipment, i.e. sUE, a request to access the communication system.

In step 304, the apparatus is configured to transmit a request to the second user equipment, i.e. mUE, to authorize the access of the first user equipment.

In step 306, the apparatus is configured to receive authorization message from the second user equipment.

In step 308, the apparatus is configured to allow the access of first user equipment to the communication system on the basis of the message.

The process ends in step 310.

Figure 3B:
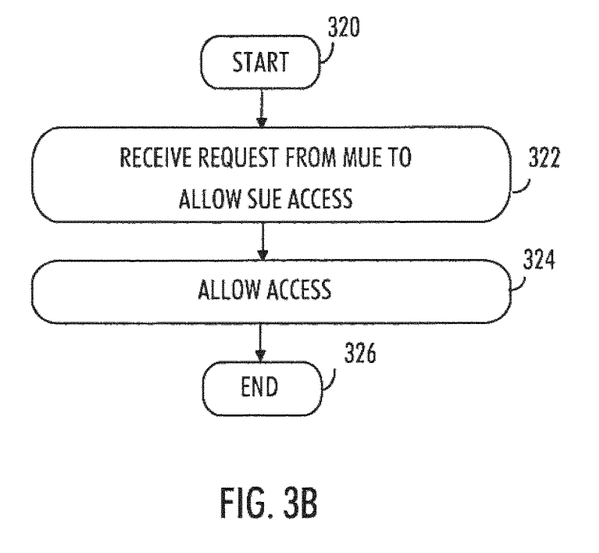

FIG. 3B is a flowchart illustrating an embodiment. The apparatus employing the embodiment may be a network element of a communication system. Also in this example, sUE is denoted as first user equipment and mUE as second user equipment. The process starts at step 320.

In step 322, the apparatus is configured to receive from the second user equipment a request to allow the access of the first user equipment to the communication system the access being authorized by the second user equipment.

In step 324, the apparatus is configured to allow the access of first user equipment to the communication system on the basis of the message.

The process ends in step 326.

Figure 4A:
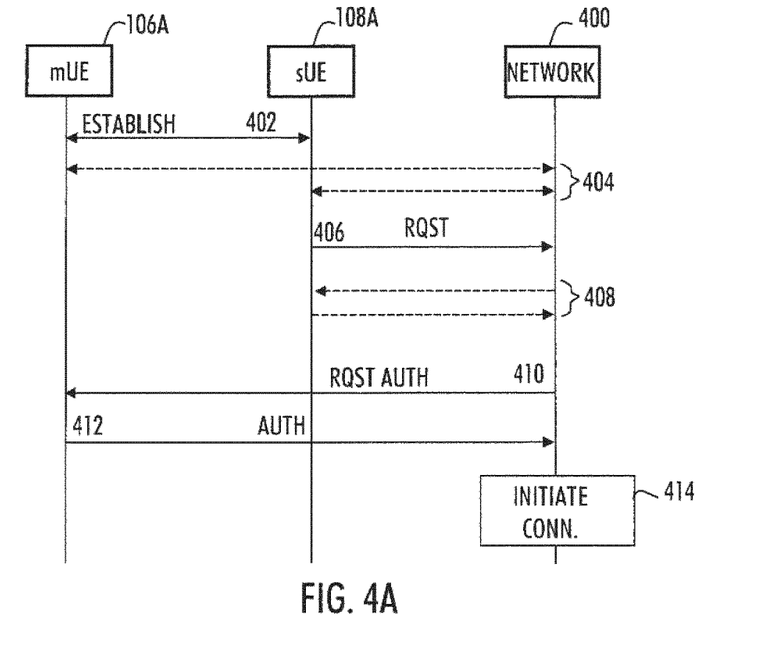
FIGS. 4A, 4B, 4C, and 4D are signalling charts illustrating some embodiments.

FIG. 4A is a signalling chart illustrating an embodiment. In this embodiment, it is proposed that a sub-user relationship between sUE and mUE is registered and preconfigured beforehand to both the network and UE sides and then sUE is allowed to request restricted access service which is granted only with on-the-fly permission confirmation from mUE. In this example it is assumed that the sUE comprises SIM/USIM but has restricted communication rights.

The signalling chart illustrates example signalling between mUE 106A, sUE 108A and a network element 400 of a communication network. At the network side, network element or elements 400 participating in the signalling may comprise MME 112 and eNodeB 102, for example.

First, sub-user relationship between sUE 108A and mUE 106A is established 402 between the devices. The relationship may be registered 404 at the network side by sUE 108A and mUE 106A or both. This establishment is made beforehand. The relationship may be established in advance as a part of subscription profiles of the involved users. It may be created when purchasing devices or one of the devices, for example. One device may be a parent's mobile phone and the sub-user device a child's phone, for example. The establishment may enable D2D communication between the devices but it is not necessary.

The sUE 108A connects to the communication network and transmits a request 406 regarding a restricted access service to the network The service may be a data call or connection, for example. The request may or may not explicitly indicate the identity of the mUE 106A. As the sub-user relationship between the sUE and the mUE has been established earlier, the devices need not be in D2D range or utilize D2D when the sUE requests connection from the network.

The network 400 is configured to check the request coupled with profile information and context of sUE and find out intended mUE 106A. The network may or may not request 408 the sUE to provide an explicit intended mUE identification (such as a telephone number) after receiving the request 406 from sUE.

The network is configured to contact the mUE 106A by means including paging the mUE if the mUE is not in connected state at that moment, for authorization 410 of the sUE. As an implementation example, the mUE may get an application service message such as a short message 410 (using short message service SMS) as authorization request for sUE and reply 412 the SMS as authorization feedback.

The network is configured to to service 414 the sUE request based on authorization feedback 412 from mUE.

In an embodiment, the network may contact the mUE 106A for, e.g., updated confirmation or authorization of the sUE 108A at any time instant during the course of the cellular access service the sUE.

It may be noted that the mUE may be released by the network or itself after the authorization 410, 412 completed.

Figure 4B:
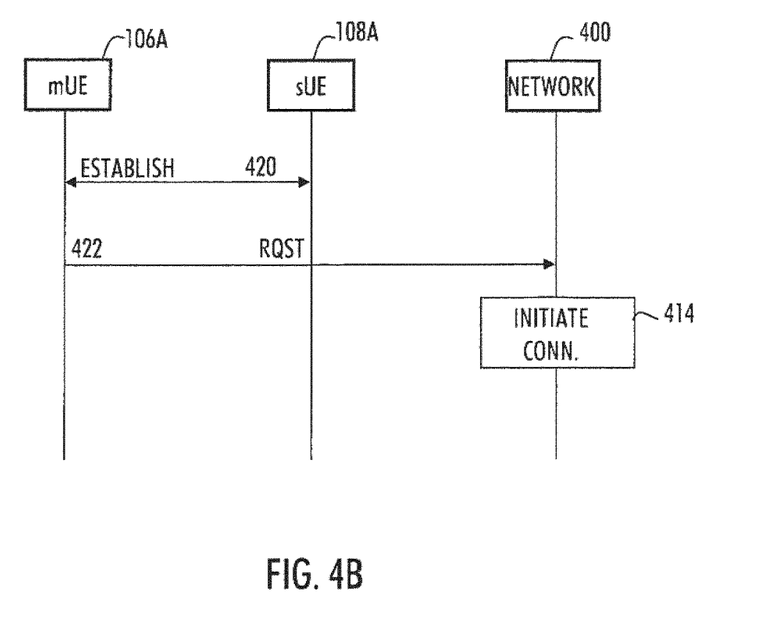

FIG. 4B is a signalling chart illustrating an embodiment. In this embodiment, it is proposed that the sub-user relationship between the sUE and the mUE toward the serving network of mUE may be established on-the-fly wherein the intended the mUE takes full responsibility for authentication, authorization and accounting related issues upon requesting a restricted access for the sUE. This includes the case provided that the sUE and the mUE are in proximity of each other so that D2D connection between sUE and mUE may be established to facilitate on-the-fly restricted service request for sUE.

The mUE gets connected 420 to sUE of interest via D2D mode which can be either autonomous (without network support) or network-controlled at the start. The mUE and the sUE may exchange information including some UE identity, capability information and cellular access restriction information over D2D.

The mUE may be configured to indicate 422 the network about the sUE and D2D connection with the sUE and request the network to establish one-time sub-user relationship with the sUE and authorize the sUE for restricted services.

The network determines, based upon the request from the mUE, to provide 414 the sUE with an updated cellular access connection so that the sUE may get access to restricted services directly and configure that to the sUE, either directly or via the mUE Again, the network may contact the mUE for, e.g., updated confirmation or authorization of the sUE at any time instant during the course of the cellular access service the sUE.

Figure 4C:
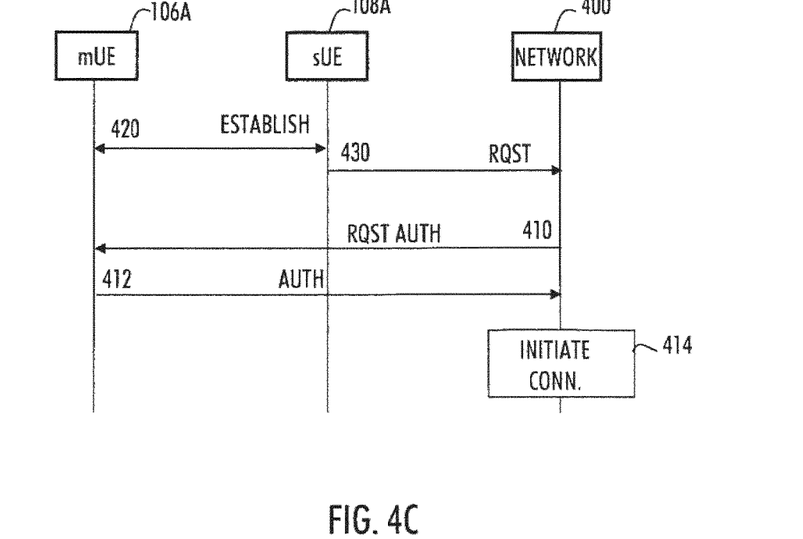

FIG. 4C is a signalling chart illustrating an embodiment. Also in this embodiment, the sub-user relationship between the sUE and the mUE toward the serving network of mUE may be established on-the-fly.

The mUE gets connected 420 to sUE of interest via D2D mode which can be either autonomous (without network support) or network-controlled at the start.

The sUE transmit the network a message 430 indicating the network about the mUE and the D2D connection with mUE. The message comprises a request to establish one-time sub-user relationship with the sUE and authorize the sUE for restricted services.

The network polls 410 the mUE for permission to establish one-time sub-user relationship with the sUE and authorize the sUE for restricted services.

The mUE is configured to transmit response 412.

The network determines 414, based upon the mUE response 412, to provide the sUE with an updated cellular access connection so that the sUE may get access to restricted services.

Like before, the network may contact the mUE for, e.g., updated confirmation or authorization of the sUE at any time instant during the course of the cellular access service the sUE.

It may be noted that the mUE may be released by the network or itself after the authorization completed. For a less real-time more user keying-in solution, the mUE may request an access token from the network for any restricted sUE by using, e.g., SMS, as provided with WiFi access.

Figure 4D:
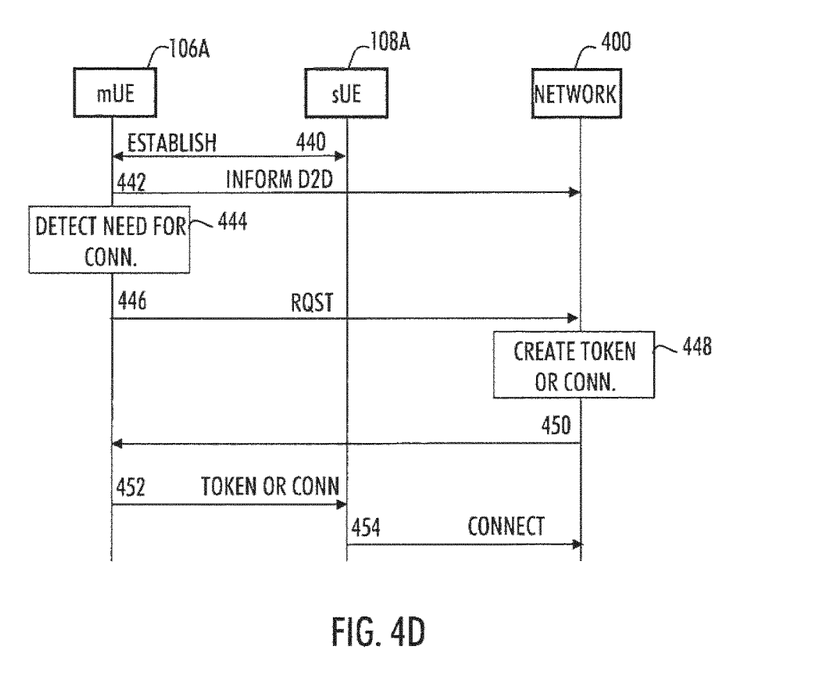

FIG. 4D is a signalling chart illustrating an embodiment. In this embodiment, it is proposed that the mUE with one or more sUEs without SIM connected to it and which uses autonomous D2D mode in communicatinbg with sUEs forms a novel type of extended or distributed UE capability category which may access the network with one or multiple coordinated or non-coordinated Evolved Packet Core EPC connections, each terminated in one of the sUE or mUE devices. The mUE is responsible for all authentication, authorization and accounting related issues of the sUEs and helps requesting EPC connection for each sUE of interest.

First, a D2D connection is set up 440 between the mUE and the sUE using autonomous D2D mode (without network involvement or assistance). The connection may be realized with 3GPP based radio interface, Bluetooth® or IEEE 802.11 direct mode, for example. The mUE is responsible for authenticating and authorizing the sUE.

The mUE gets connected to the serving cellular network and informs 442 the network about its current extended or distributed UE capability and context.

When need for sUE to access the cellular network is determined 444 in the mUE the mUE requests 446 an "access token" or an additional EPC connection for the sUE. For the latter, the additional EPC connection requested by the mUE for the UE may then request a new Radio Resource Control RRC connection and corresponding UE context (e.g. Cell Radio Network Temporary Identity C-RNTI, Radio Bearer configurations, Random Access Channel RACH preamble etc.) to be established in radio access network RAN for the sUE.

The network determines 448 to grant the requested access token or additional EPC connection with all necessary configurations and transmit 450 necessary information to the mUE. The mUE transfers 452 the access token or additional EPC connection related configurations including corresponding UE context to the sUE via the D2D connection.

The sUE uses the access token as the permission to access 454 the network by itself or uses the EPC connection given by the mUE via D2D to get access to the selected serving eNB and GW (e.g. S-/PDN-GW).

The mUE may release itself from D2D or cellular access after helping the sUE to get the network access.

The network may contact the mUE for, e.g., confirmation or authorization of the sUE at any time during the course of the sUE cellular access.

Figure 5A:
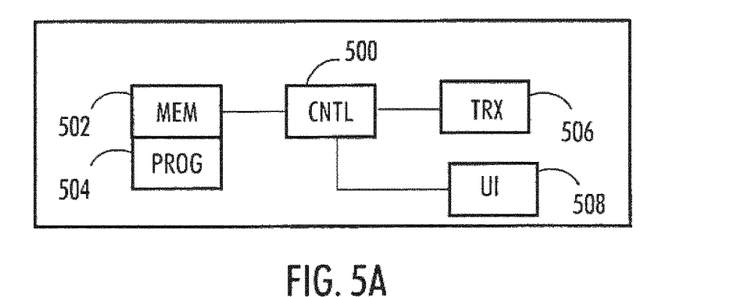
FIGS. 5A and 5B illustrate examples of apparatuses applying embodiments of the invention.

FIG. 5A shows an example of a block diagram of the structure of an apparatus according to an example embodiment. The apparatus of an example embodiment need not be the entire apparatus, but may be a component or group of components of the apparatus in other example embodiments.

In some embodiments, the device may be user equipment UE or a respective device. The device may be a part or a section of user equipment.

Figure 5B:
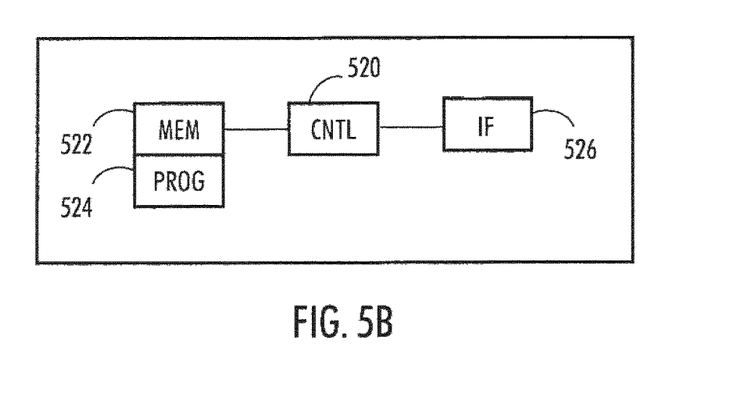

FIG. 5B illustrates a simplified example of a device in which some embodiments of the invention may be applied. In some embodiments, the device may be a network element such as a base station or an eNodeB of a communication system or network or MME of a communication network. The device may be a part or a section of a base station, an eNodeB or MME.

It should be understood that the apparatuses are depicted herein as examples illustrating some embodiments. It is apparent to a person skilled in the art that the devices may also comprise other functions and/or structures and not all described functions and structures are required. Although the devices have been depicted as single entities, different modules and memory may be implemented in one or more physical or logical entities. In addition, each device may be a part of another device.

FIG. 5A illustrates a simplified example of user equipment UE or a respective device. The device of the example includes one or more control circuitries or processing circuits (CNTL) 500 configured to control at least part of the operation of the device.

The device may comprise one or more memories (MEM) 502 for storing data. Furthermore the memory may store software (PROG) 504 executable by the control circuitry 500. The memory may be integrated in the control circuitry.

The device may comprise one or more transceivers (TRX) 506. The transceiver or transceivers are operationally connected to the control circuitry 500. It may be connected to an antenna arrangement (not shown). The device may also comprise a connection to a transceiver instead of a transceiver.

The software 504 may comprise a computer program comprising program code means adapted to cause the control circuitry 500 of the device to control a transceiver 506.

The device may further comprise user interface (UI) 508 operationally connected to the control circuitry 500. The user interface may comprise a display which may be touch sensitive, a keyboard or keypad, a microphone and a speaker, for example.

In an embodiment, the apparatus of FIG. 5A is the mUE. The software 504 may comprise a computer program comprising program code means adapted to cause the control circuitry 500 of the device to be capable of communicating with a communication system as authentic and authorized user equipment, be configured to communicate with device-to-device communication with user equipment and communicate with the communication system to authenticate the access of another user equipment to the communication system.

The mUE may comprise a transceiver for communicating with the communication network and a separate transceiver configured to establish D2D connections with other UEs. The network connections and D2D connections may also be realized with the same transceiver.

In an embodiment, the apparatus of FIG. 5A is the sUE. The software 504 may comprise a computer program comprising program code means adapted to cause the control circuitry 500 of the device to be configured to communicate with device-to-device communication with user equipment authentic and authorized with a communication system and communicate with the communication system, wherein the communication is authenticated by the authentic and authorized user equipment.

The sUE may comprise a transceiver for communicating with the communication network and a separate transceiver configured to establish D2D connections with other UEs. The network connections and D2D connections may also be realized with the same transceiver.

Referring to FIG. 5B, the device of the example includes one or more control circuitries or processing circuits (CNTL) 520 configured to control at least part of the operation of the device.

The device may comprise one or more memories (MEM) 522 for storing data. Furthermore the memory may store software (PROG) 524 executable by the control circuitry 520. The memory may be integrated in the control circuitry.

The device may comprise one or more interface circuitries (IF) 526. The interface circuitry is operationally connected to the control circuitry 520. The interface circuitry may be a transceiver configured to communicate with user equipment. It may be connected to an antenna arrangement (not shown). The device may also comprise a connection to a transceiver instead of a transceiver. The interface circuitry may be a communication interface configured to communicate with other network elements of the communication system with wired or wireless links.

The steps and related functions described in the above and attached figures are in no absolute chronological order, and some of the steps may be performed simultaneously or in an order differing from the given one. Other functions can also be executed between the steps or within the steps. Some of the steps can also be left out or replaced with a corresponding step.

The apparatuses or controllers able to perform the above-described steps may be implemented as an electronic digital computer, processing system or a circuitry which may comprise a working memory (RAM), a central processing unit (CPU), and a system clock. The CPU may comprise a set of registers, an arithmetic logic unit, and a controller. The processing system, controller or the circuitry is controlled by a sequence of program instructions transferred to the CPU from the RAM. The controller may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

An embodiment provides a computer program embodied on a distribution medium, comprising program instructions which, when loaded into an electronic apparatus, are configured to control the apparatus to execute the embodiments described above.

The computer program may be in source code form, object code form, or in some intermediate form, and it may be stored in some sort of carrier, which may be any entity or device capable of carrying the program. Such carriers include a record medium, computer memory, read-only memory, and a software distribution package, for example. Depending on the processing power needed, the computer program may be executed in a single electronic digital computer or it may be distributed amongst a number of computers.

The apparatus may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus, the necessary processing capacity, production costs, and production volumes, for example.

It will be obvious to a person skilled in the art that, as the technology advances, the inventive concept can be implemented in various ways. The invention and its embodiments are not limited to the examples described above but may vary within the scope of the claims.

The invention claimed is:

1. An apparatus, comprising:
at least one processor; and
at least one memory including computer program code, the at least one memory and the computer program code configured to, with the at least one processor, cause the apparatus at least to:
communicate with a communication system as authentic and authorized user equipment to the communication system;
store on the authorized user equipment authentication information of the authorized user equipment to the communication system for another user equipment which has not been authorized access by the communication system;
use a device-to-device communication link to form device pairing of the authorized user equipment and the another user equipment; and
using the authentication information of the authorized user equipment stored on the authorized user equipment, communicate with the communication system to cause the communication system to authorize access of the another user equipment to the communication system based on the device pairing with the authorized user equipment using the device-to-device communication link.

2. The apparatus of claim 1, wherein the at least one memory and the computer program code is configured with the at least one processor to cause the apparatus to:
register at the communication system as having a sub-user relationship with the another user equipment at the communication system;
receive a request from the communication system to authorize the access of the another user equipment to the communication system; and
transmit a response to the request to the communication system.

3. The apparatus of claim 1, wherein the authorized access of the another user equipment to the communication system based on the authentication information of the authorized user equipment stored on the authorized user equipment is to allow sending messages and making phone calls, but further data traffic is prohibited by the another user equipment.

4. The apparatus of claim 1, wherein the at least one memory and the computer program code is configured with the at least one processor to cause the apparatus to:
transmit a request to the communication system to authorize the access of the another user equipment to the communication system.

5. The apparatus of claim 1, wherein the at least one memory and the computer program code is configured with the at least one processor to cause the apparatus to:
receive a request from the communication system to authorize the access of the another user equipment to the communication system; and
transmit a response to the request to the communication system.

6. The apparatus of claim 1, wherein the at least one memory and the computer program code is configured with the at least one processor to cause the apparatus to:
transmit to the communication system information about the another user equipment;
transmit a request to the communication system to authorize the access of the another user equipment to the communication system;
receive from the communication system information enabling the authorized access of the another user equipment; and
transmit using the device-to-device connection to the another user equipment the information, wherein the another user equipment does not have a subscriber identity module.

7. The apparatus of claim 6, wherein the at least one memory and the computer program code is configured with the at least one processor to cause the apparatus to:
request an additional Enhanced Packet Core connection to be set up for the another user equipment.

8. The apparatus of claim 6, wherein the at least one memory and the computer program code is configured with the at least one processor to cause the apparatus to:
request an access token for the another user equipment, the access token comprising an authorized configuration profile including needed access parameters, restrictions or limitations, guidelines the another user equipment can use to access the communication system.

9. The apparatus of claim 6, wherein the at least one memory and the computer program code is configured with the at least one processor to cause the apparatus to:
request an access token for the another user equipment, the access token comprising authentication related parameters so that device can use those authentication/security related information to access the network.

10. A method, comprising:
communicating, by a first user equipment, with a communication system, the first user equipment being an authentic and authorized user equipment to the communication system;
storing on the first user equipment, by the first user equipment, authentication information of the first user equipment to the communication system for another user equipment which has not been authorized access by the communication system;
using a device-to-device communication link form device pairing of the first user equipment and the another user equipment;
using the authentication information stored on the first user equipment, communicating with the communication system to cause the communication system to authorize the access of the another user equipment to the communication system based on the device pairing with the first user equipment using the device-to-device communication link.

11. The method of claim 10, further comprising
registering a sub-user relationship with the another user equipment at the communication system;
receiving a request from the communication system to authorize the access of the another user equipment to the communication system; and
transmitting a response to the request to the communication system.

12. The method of claim 11, further comprising
receiving the request and transmit the response using application service.

13. The method of claim 10, further comprising
transmitting a request to the communication system to authorize the access of the another user equipment to the communication system.

14. The method of claim 10, further comprising
receiving a request from the communication system to authorize the access of the another user equipment to the communication system; and
transmit a response to the request to the communication system.

15. The method of claim 10, further comprising
transmitting to the communication system information about the another user equipment;
transmitting a request to the communication system to authorize the access of the another user equipment to the communication system;
receiving from the communication system information enabling the authorized access of the another user equipment; and
transmitting using the device-to-device connection to the another user equipment the information, wherein the another user equipment does not have a subscriber identity module.

16. The method of claim 15, further comprising
requesting an additional Enhanced Packet Core connection to be set up for the another user equipment.

17. The method of claim 15, further comprising
requesting an. access token for the another user equipment, the access token comprising an authorized configuration profile including needed access parameters, restrictions or limitations, guidelines the another user equipment can use to access the communication system.

18. A method, comprising:
communicating in a communication system with a second user equipment of the communication system, wherein the second user equipment is allowed access to the communication system based on authentication information of the second user equipment;
based on the communicating, storing on the second user equipment authentication information of the second user equipment for a first user equipment which has not been authorized access by the communication system;
using a device-to-device communication link form device pairing of the second user equipment and the first user equipment; and
allowing access of the first user equipment to the communication system, the access being authorized using the authentication information stored on the second user equipment provided by the second user equipment and stored on the first user equipment during the communicating, wherein the access is based on the device the pairing with the first user equipment using the device-to-device communication link.

19. The method of claim 18, wherein the communicating comprises:
receiving from the first user equipment a request to access the communication system;
transmitting an request to the second user equipment to authorize the access of the first user equipment
receiving authorization message from the second user equipment; and
allowing the access of first user equipment to the communication system on the basis of the message.

20. The method of claim 19, wherein the request of the first user equipment comprises identification of the second user equipment.

21. The method of claim 18, wherein the communicating comprises:
receiving from the second user equipment a request to allow the access of the first user equipment to the communication system the access being authorized by the second user equipment; and
allowing the access of first user equipment to the communication system on the basis of the message.

22. A computer program product embodied on a distribution non-transitory medium readable by a computer and comprising program instructions which, when loaded into an apparatus, execute the method according to claim 10.

\* \* \* \* \*